July 1, 1958 M. STROUKOFF 2,841,344
BOUNDARY LAYER CONTROL
Filed Nov. 28, 1955 5 Sheets-Sheet 3

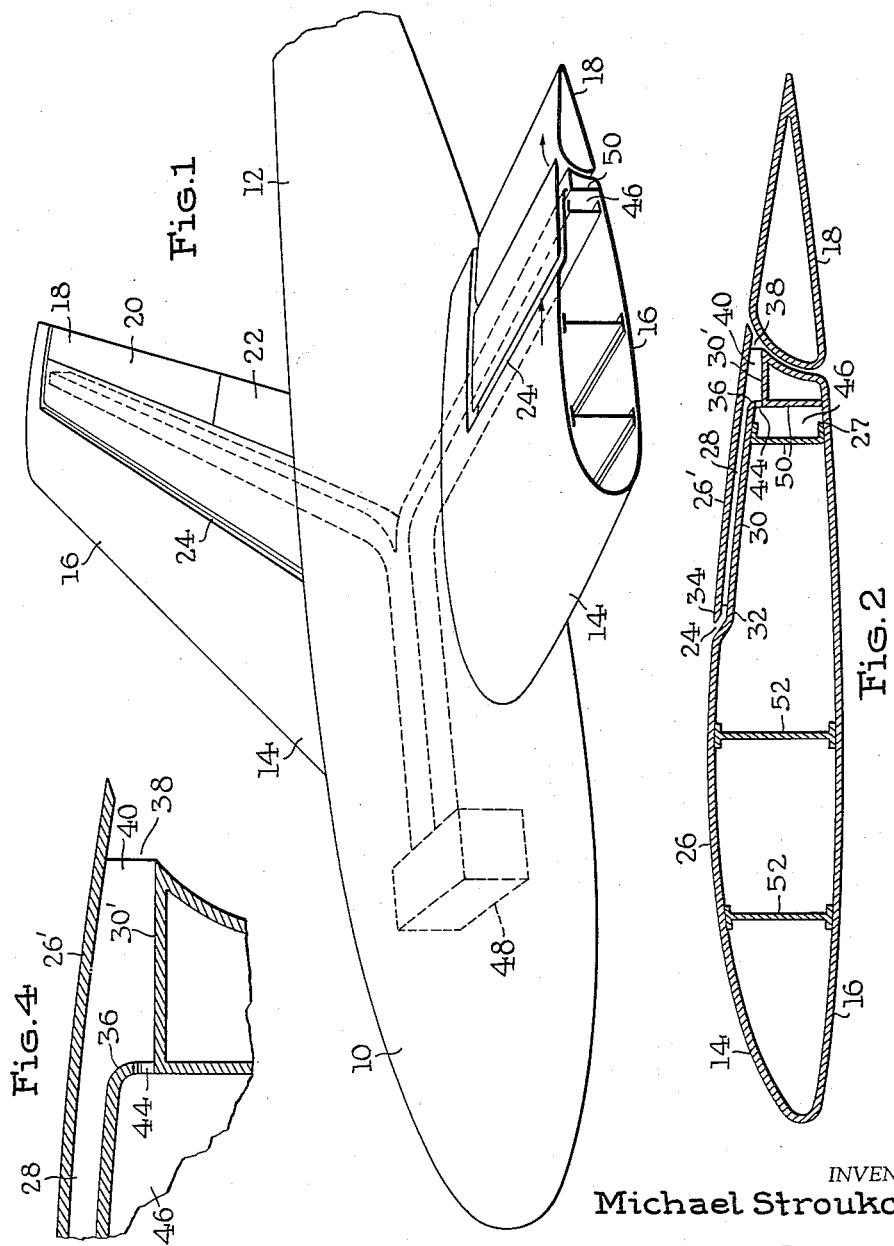

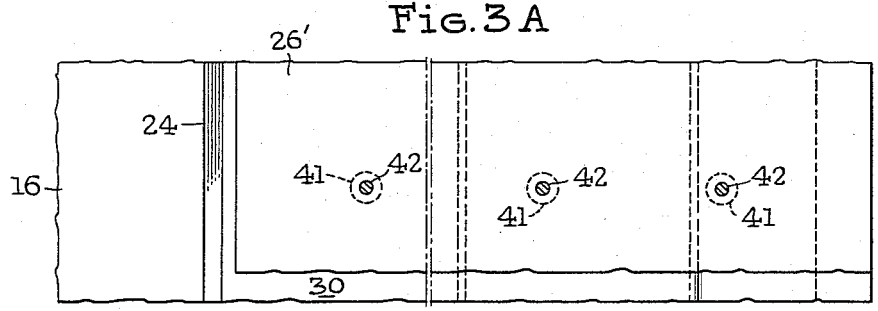
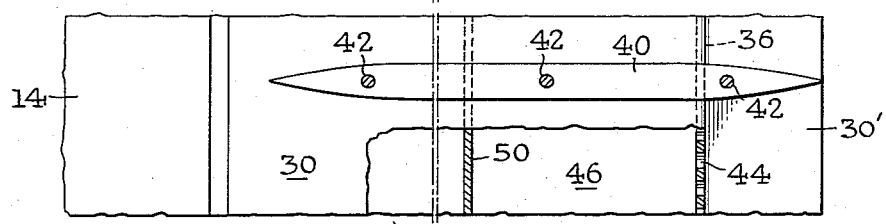
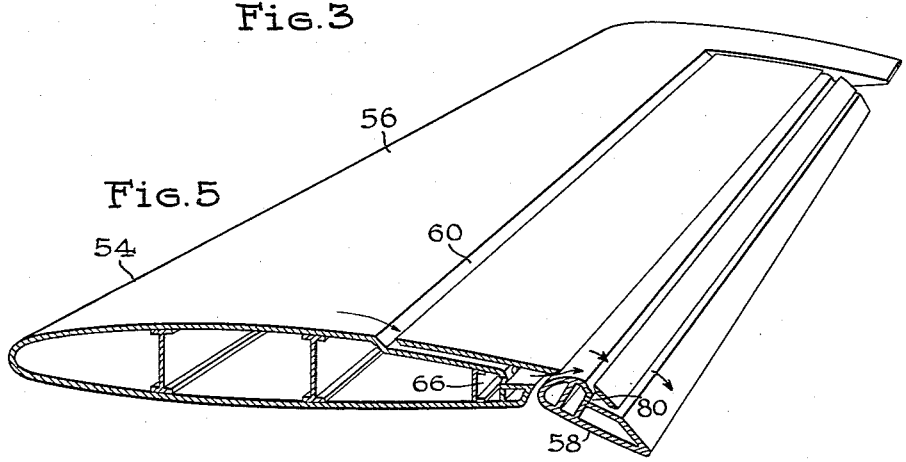
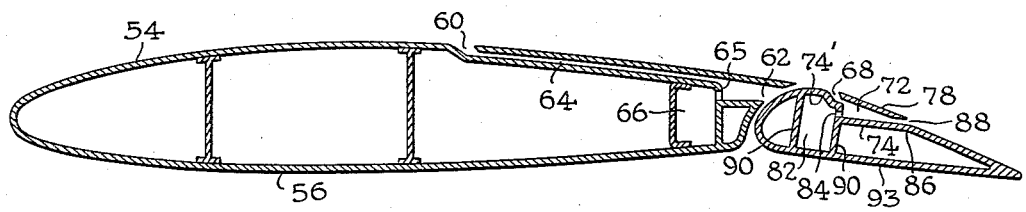

INVENTOR
Michael Stroukoff
BY
ATTORNEY

July 1, 1958 — M. STROUKOFF — 2,841,344
BOUNDARY LAYER CONTROL
Filed Nov. 28, 1955 — 5 Sheets-Sheet 4
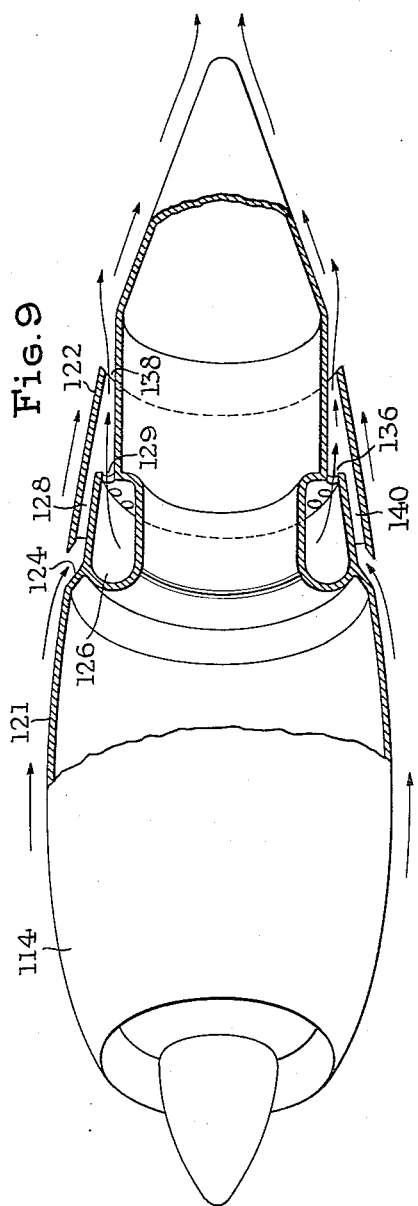
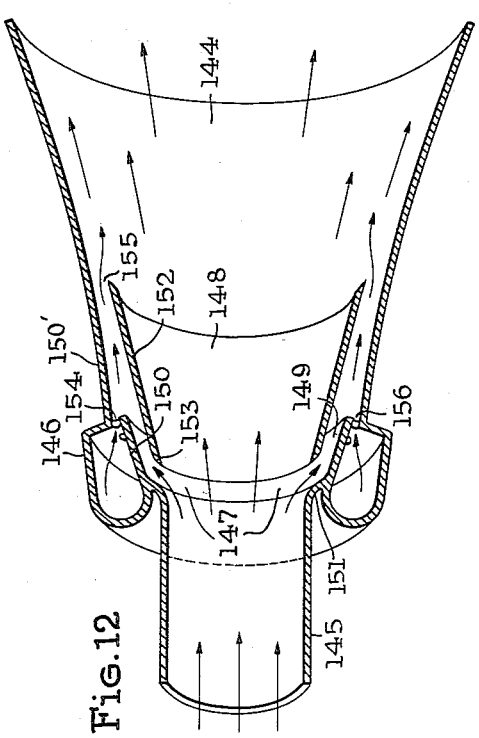
INVENTOR
Michael Stroukoff
BY
ATTORNEY July 1, 1958 M. STROUKOFF 2,841,344
BOUNDARY LAYER CONTROL
Filed Nov. 28, 1955 5 Sheets—Sheet 5
Fig.11
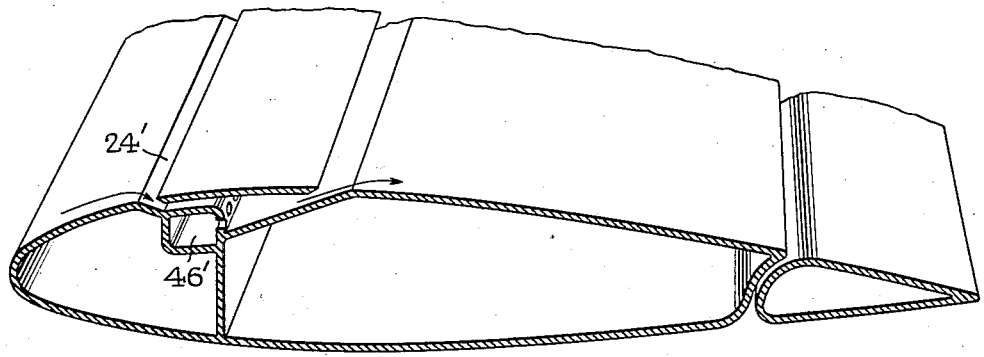
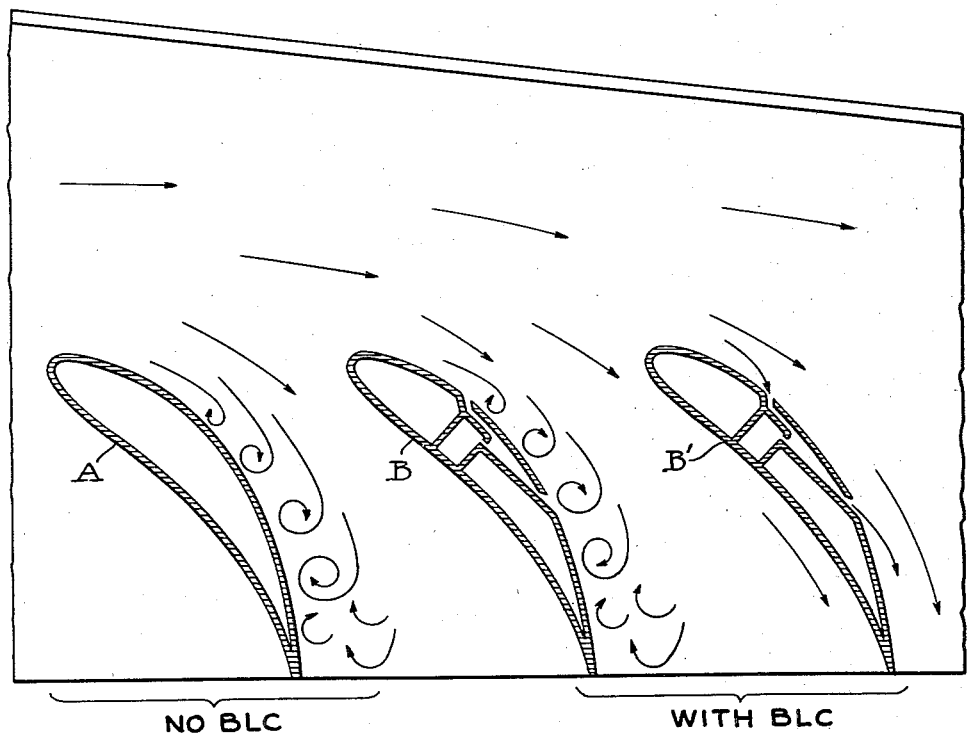
Fig.13
*INVENTOR*
Michael Stroukoff
BY
*ATTORNEY*

United States Patent Office 2,841,344
Patented July 1, 1958

2,841,344

BOUNDARY LAYER CONTROL

Michael Stroukoff, Lawrenceville, N. J.

Application November 28, 1955, Serial No. 549,325

15 Claims. (Cl. 244—42)

This invention relates to improved aerodynamic characteristics of airflow in general; either external aerodynamics of flying bodies such as aircraft or missiles or internal aerodynamics such as flow in ducts, diffusers, flow turning vanes, etc., and more particularly to a device for changing the characteristics of airfoils or hydrofoils, especially designed to control the boundary layer of a fluid on the surface of any moving body in order to increase the lift and/or to decrease the drag.

It is known that by control of the boundary layer, the circulation of air around the profile of a body or airfoil, flight control surfaces such as rudders and ailerons, or lift surfaces such as a wing and flaps, can be improved so as to remove or to minimize turbulence of the air and maintain laminar flow with a consequent increase in lift and a reduction in drag. It is also known that this circulation control can be accomplished by blowing and/or suction through slots, and in the gaps resulting from the presence of a main body and pivotal control surfaces such as flap or aileron, etc., and that in so doing the efficiency of the control surface is also improved. In the past, such circulation control has taken the form of removal of the boundary layer through suction slots disposed on the surface of the airfoil rearwardly of its leading edge. In some instances, such removal of the boundary layer has been augmented by creating a blowing flow of air out of slots disposed in the airfoil surfaces rearwardly. It is to this combined sucking and blowing control of the boundary layer that this invention is directed.

Although such combined control is known, at least in theory, no means had been developed prior to this invention for practicing such control without complicated and involved arrangements which could not be embodied in a practical aircraft, due to excessive weights, requirements of tremendous power to operate the systems, and the excessive obstruction of internal space of the body which is normally required for many other primary purposes.

Consequently, it is an object of this invention to provide an improved, practical and feasible structural and aerodynamic arrangement for controlling the boundary layer of a body in motion. Basically, this invention consists of a single continuous channel inter-connecting both blowing and suction slots, and remaining within the contour of the body, where boundary layer control is achieved by blowing small amounts of air at high velocity through apertures, thereby supplying energy to the boundary layer in order to increase lift or decrease drag of the body. In blowing energy the back pressure, normally found in such systems, is relieved by the opening which in the device of this invention forms the suction slot. The resultant suction aids in removing a portion of the boundary layer upstream and thereby increases the amount of air energizing the boundary layer blowing downstream. Both suction and blowing are combined as a force to control boundary layer, therefore decreasing the required energy or the supply of compressed fluid to operate this device.

Consequently, it is another objective of this invention to provide an improved system of boundary layer control which requires a very minimum of power to operate.

It is a further object of the present invention to provide a device for increase of lift and decrease of drag of a body by producing the required suction and blowing without deflecting any other portions of the wing which are not normally deflected (such as aileron and ordinary flap) and does not rely on the deflection of any surface to provide the necessary opening of a suction or blowing slot.

It is a still further object of this invention to provide a practical and feasible structure which embodies this improved boundary layer control system.

This invention has several advantages, namely: It increases the lift of the hypersustaining section of the profile of flying body by re-energizing deficient flow from the trailing edge forward, thus keeping continuity of laminar flow by increasing the circulation of air; and in the event the air flow becomes stagnant or separated from the airfoil, the device of the invention re-attaches the disturbed flow to the body, thus keeping the efficiency at a high value at all times. This increased lift assists in takeoffs and landings, and the decreased drag assists in cruise or high speed, and accessorily delivers a supplemental thrust of considerable value.

The volume of air required to operate the device of this invention is independent of airplane speed; therefore, no increase or decrease of energy is needed with increase or decrease of speed of the aircraft. The propulsion power of the aircraft, when it is used as the prime source of compressed air or fluid for the device, will be reduced a negligible amount because the energy required by the device is small and is reconverted into thrust.

The air supply duct may be rectangular, tubular, elliptical, rhombic, or any other shape consistent with the structure of the body to which it is applied. The air is injected through a series of holes, without any special nozzles or slots, into one continuous mixing chamber. It is not necessary for injected air to pass through the median plane of the mixing chamber. No individual or series of venturi tubes or venturi slots are required.

The outblowing slot and intake suction slot are interconnected by a common uninterrupted channel. The outer part of the channel is not part of the structure but is a completely individual or detachable fairing and remains within the shape of the airfoil or body.

In this device, no special nozzles are used or attached to the spanwise supply duct. The operation of this device is accomplished with a simple apparatus without separate subdivisions, deflectors or venturi tubes at the blowing orifices.

The cross-sectional area at the exit or blowing slot in relation to the cross-sectional area of the channel at the injection orifices should be one-half or less and is determined by the pressure in the supply duct and the velocity of fluid supplied. The velocity of the flying body has no effect or control on the amount of air supply blown through the device.

The suction slot shall be located on the upper surface of the airfoils between 15% and 55% of the total chord measured from leading edge, exact location depending upon shape of the body, the pressure in the duct and the optimum design velocity of the aircraft.

The flow of the air around the airfoil or body at the discharge slot is rearward, which is conventional. In this device, the airflow at and after the discharge slot is directed parallel to the surface, thus ensuring that the flow around the airfoil or body does follow the surface of the body.

The blowing in the device of this invention is accomplished by ordinary holes in the supply duct wall from which air blows into one and common mixing chamber.

The suction and blowing slots are permanent and immovable in respect to location, orientation and dimensions for the given configuration and do not depend on any deflection of the body such as drooping nose section or flap or aileron deflection.

This device is applicable to any type of flying body to control or increase circulation or flow of air to increase lift or decrease drag.

This device utilizes orifices or holes for supplying the blowing air. The distribution of the holes in the supply duct is uniform throughout the span or length of the body.

The boundary layer control devices to date, utilize the major portion of the internal volume of the wing which is filled with all kinds of devices and ducts. The device covered by this invention requires a very insignificant portion of the wing space or volume, and leaves free space for fuel, oil, controls, and other mechanisms ordinarily necessary for the aircraft. Therefore, it is practical and readily feasible for construction, installation and utilization.

The suction and blowing in this device acts simultaneously upon the boundary layer to increase the lift or decrease the drag of the body.

In the first embodiment of this invention which will be explained in the following detailed description later, a single continuous channel, interconnecting both blowing and suction slots, is located directly under the contour of the body where the lower portion of the channel is formed by the structure of the body and the upper portion of the channel is formed by a fairing located within the contour of the body. The forward part of the channel, formed by the structure and fairing, forms a slot which should be located between 45% and 55% of the wing chord aft of the leading edge, the exact location being the function of the airfoil or body. The aft part of the channel forms a continuous mixing chamber. Small amounts of air supplied from a continuous supply duct are ejected through orifices or holes, uniformly spaced throughout the length of the supply duct, into the mixing chamber. This high velocity blowing induces or creates low pressure in the mixing chamber which in turn induces air to flow through the suction slot and in the channel. This suction removes a portion of the boundary layer air upstream which combines with the ejected air in the mixing chamber. The combined air is ejected out parallel to the body surface, thereby re-energizing the boundary layer of the air and produces a laminar flow over the body throughout the entire chord of the body. This produces increased lift and decreased drag over the body.

In another variant of this invention, when it is desirable to increase lift in the forward portion of the body by preventing premature separation of flow around the body, the suction slot formed by the upper fairing and body structure may be located at the forward portion of the body at approximately 15% of the chord from the leading edge.

In the third embodiment of this invention, to be explained in a detailed description later, a single continuous channel interconnecting both blowing and suction slots, is located directly under the upper contour of a pivotal surface such as an aileron, flap, elevator, or rudder, where the lower portion of the channel is formed by the structure of the body and the upper portion of the channel is formed by a fairing located within the contour of the pivotal surface. The forward end of the channel, formed by the structure and fairing, forms a suction slot which should be located on the pivotal surface in such a manner that when the surface is undeflected, this slot lies directly aft of the fixed surface to which the pivotal surface is attached. The aft end of the channel forms a continuous mixing chamber. Small amounts of air supplied from a continuous supply duct in the pivotal surface, where such supply duct forms an integral part of the structure of the pivotal surface, are ejected through orifices or holes uniformly spaced through the length of the supply duct, into the mixing chamber. This high velocity blowing induces or creates a low pressure in the mixing chamber, which in turn induces air to flow through the suction slot and in the channel. This suction removes a portion of the boundary layer air upstream which combines with the ejected air in the mixing chamber. The combined air is ejected out parallel to the upper surface of the pivotal body, regardless of the position of the pivotal body with respect to the fixed surface, thereby re-energizing the boundary layer of the air and produces a laminar flow over the body through the entire chord of the body. This produces increased lift and decreased drag over the body.

In the fourth embodiment, the device of this invention, comprising a suction and blowing slot interconnect by a channel, an air supply duct and a plurality of ejecting orifices, is positioned as a unit in several successive locations along the airfoil or body. The location of said units depends on the form or shape of the airfoil or body. The repeated effect of successive devices (along the surface of the body) results in energizing the boundary layer throughout the body, thus increasing lift and decreasing drag of the body.

In the fifth embodiment of this invention, which relates to its application, where it is desirable to control the boundary layer of air on the lower or any surface of the body or airfoil, a device of this invention or a plurality of such devices, are positioned to operate along the lower surface of the airfoil or body or any side thereof. When a plurality of devices are used they can act simultaneously or independently and they are placed in successive positions along the airfoil or body. The use of such a unit or units in the lower surface can be combined with the operation of a unit or units in the upper surface. In the case of a body of revolution such as a nacelle or fuselage, the continuous channel or channels interconnecting both blowing and suction slots are located around the periphery of body where such channels may be used singly or in series as described in the previous embodiments.

The present invention can be advantageously applied to compressor blades, guide vanes, diffusers, etc., to improve their operating characteristics.

Although the invention will be illustrated and described with reference to an aircraft wing, it will be realized that the invention is applicable to other types of bodies such as nacelles, fuselages or controls such as elevator and rudders, or to other elements as described above, or any body where it is desirous to increase circulation of air around a body for the purpose of increasing lift or decreasing drag or increasing control.

Other objects and advantages will be in part pointed out and in part evidenced from the following descriptions and accompanying drawings in which:

Fig. 1 is a perspective view, partly in section of an airplane having this invention embodied in a wing thereof.

Fig. 2 is an enlarged chordwise sectional view of the wing of the airplane shown in Fig. 1.

Fig. 3 is a fragmentary plan view of the wing shown in Fig. 2 with parts broken away to illustrate details.

Fig. 3A is a view similar to Fig. 3 but showing a different embodiment of a detail.

Fig. 4 is an enlarged fragmentary view of a portion of Fig. 2.

Fig. 5 is a perspective view, partly in section, of an aircraft wing embodying a modified form of this invention, where the system can be used for either fixed surfaces, pivotal surfaces or both.

Fig. 6 is an enlarged chordwise sectional view of the wing shown in Fig. 5.

Fig. 9 is a perspective view partly in section embodying a form of this invention on a body other than an airfoil such as a fuselage or nacelle.

Fig. 11 is a perspective view, partly in section, embodying a form of this invention where the system is used to control boundary layer air near the leading edge.

Fig. 12 is a perspective view, partly in section, embodying a form of this invention where the system is used to control boundary layer air in a diffuser.

Fig. 13 is a sectional view embodying a form of this invention in guide vanes or compressor blades.

Figure 7:
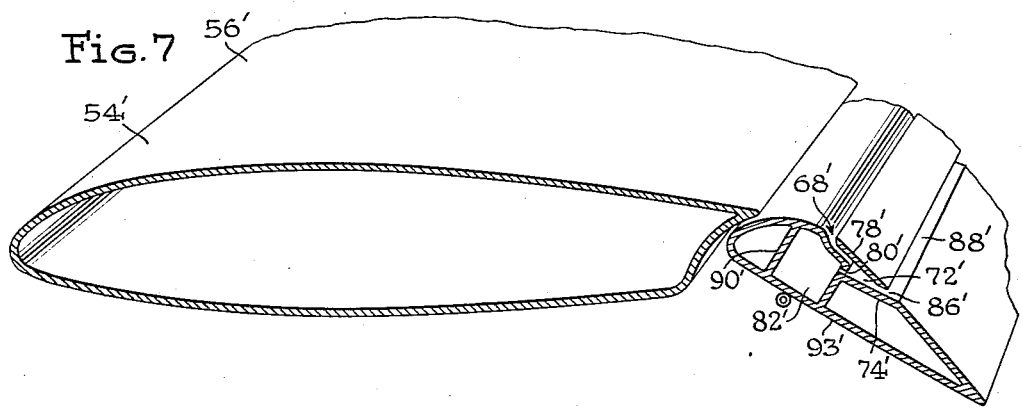
Fig. 7 is a perspective view partly in section embodying a modified form of this invention where the system is used on a pivotal surface only.

Referring now to the drawings: There is shown in Fig. 1 an airplane 10 having a fuselage 12 and a wing 14. As is conventional, the wing 14 has a main body 16 provided with a pivotal trailing section 18 which may be divided into outboard and inboard portions to form ailerons 20 and flap 22. Although the invention is illustrated with respect to a wing having a pivotal trailing section, the invention is equally applicable to any spanwise portion of an airfoil having no pivotal trailing section.

Extending spanwise in the upper surface of the wing main body 16, is a fixed, preferably continuous, suction or entrance slot 24 for boundary layer air. In actual practice, it has been determined that the slot 24 should be located rearwardly of the leading edge of the wing 14, a distance equal from about 45% to about 55% of the chord of the wing. As shown best in Fig. 2, the slot 24 is formed by a gap in the skin 26 of the wing 14 and communicates directly with the forward end of a shallow rearwardly extending, unobstructed passageway 28 disposed immediately beneath the upper surface of the wing. Preferably, the skin or fairing 26' rearwardly of the slot 24 forms the upper wall of the passageway 28 so that the latter extends parallel to the upper surface of the wing rearwardly of the slot.

At its forward end, the bottom wall 30 of the passageway 28 slopes smoothly upwardly, as at 32, to a junction with the forward edge of the slot 24. From a practical construction standpoint, the bottom wall 30, or at least the forward portion thereof, may be formed by a depressed rearward extension of the skin 26 forwardly of the slot 24, as shown in Fig. 2.

Preferably, the skin or fairing 26' at the rear edge of the slot 24 is bevelled, as at 34, so that such bevel and bottom wall sloping portion 32 serve to fair the passageway 28 smoothly into the slot. Consequently, boundary layer air flowing over the upper surface of the wing 14 forwardly of the slot 24 can flow smoothly through the latter into the passageway 28 without appreciable or extensive change of direction, with a resulting minimization of turbulence.

The bottom wall 30 of the passageway 28 continues rearwardly, spaced generally parallel to the fairing 26' on the upper surface of the wing 14, to a location somewhat forwardly of the trailing edge of the main body 16 of the wing. At that location, the bottom wall 30 has a downward offset to form a rearwardly facing step 36, best shown in Fig. 4. Beyond the step 36, the bottom wall 30' continues rearwardly in a more convergent relation to the fairing 26' and terminates in downward spaced relation to the rear edge of such fairing to form an exit or blowing slot 38. It will be noted that air emerging from the exit slot 38 will be directed rearwardly, substantially parallel to the upper surface of the main body 16 and the adjacent surface of the trailing section 18.

The passageway 28 is continuous and unobstructed between the slots 24 and 38 and, desirable, the passageway would be continuous in a spanwise direction. Practical structural and load consideration, however, render it necessary to support the fairing 26' of the upper surface of the main body 16 between the slots 24 and 38. This may be accomplished, as shown in Fig. 3, by a spanwise extending series of spacer members 40 (Fig. 3) or 41 (Fig. 3A) having appropriate fastening elements 42, e. g. screws extending through the fairing 26', the spacer members and the bottom wall 30. Preferably, the spacer members have any shape that will not excessively restrict the air entering or leaving the passageway 28.

Disposed in the step 36, and shown best in Fig. 4, is a spanwise-extending series of substantially uniformly spaced apertures 44 which communicate directly with a duct 46 extending the length of the slots 24 and 38. At its inboard end, the duct 46 communicates with a source of fluid under pressure, e. g. a blower or compressor 48 powered by the main engine (not shown), or one of the main engines of the aircraft 10. Any other suitable fluid under pressure, e. g. exhaust gases, can be used. Thus high velocity jets of air or fluid are directed out of the apertures 44 rearwardly into the passageway 28. Preferably, the duct 46 tapers appropriately in an outboard direction to achieve uniformity of flow through the aperture 44. As shown best in Fig. 2, the duct 46 may be formed by two spar-like members 50 acting in conjunction with the bottom wall 30 of the passageway 28 and the skin 27 on the bottom surface of the main body 16 of the wing 14. Thus, the duct 46 is of box-like construction to constitute a load-carrying structural part, e. g. a spar, of the wing 14. Obviously, the duct may have any desirable cross-section that is consistent with the structure.

The high velocity jets of air issuing from the apertures 44 not only cause a rearwardly-flowing stream of air to be blown out of the exit slot 38, but also induce suction at the entrance slot 24 to pull boundary layer air thereinto for flow rearwardly in the passageway 28. Such flow of air through the suction slot 24 augments the volume of air issuing from the aperture 44 to thus increase the volume of air blown through the exit slot 38. This combined suction and blowing action prevents separation from the upper surface of the wing 14 of the air flowing thereover, and is effective for such purpose at all speeds of the airplane 10. Consequently, lift of the wing 14 is increased and drag is decreased.

The volume of air blown through the apertures 44 is relatively small and substantially constant throughout the speed range of the aircraft 10 and, since the power required to operate the blower 48 is relatively small, the propulsive power of the airplane 10 will be reduced negligibly when its main engine or engines are used to operate the blower. When power is used, other than the propulsive power of the airplane, the high velocity of air ejected from the mixing chamber accessorily delivers a supplemental thrust of considerable magnitude. In the event the airflow becomes stagnant or separated from the surface of the body, this device re-attaches the disturbed flow to the body, thus keeping the flow over the body laminar, maintaining the high lift or low drag and maintaining the efficiency of control surfaces, particularly flaps, ailerons, rudder or elevators at a high value at all times. It also will be noted that the simplicity of the structural arrangement of slots 24 and 38, passageway 28, and duct 46 leaves the majority of the interior portion of the wing 14 unobstructed. Hence, such interior may be utilized substantially completely for conventional purposes, e. g. fuel and oil tanks, controls, etc. (not shown).

Furthermore, it will be seen that other wing spars 52 need not be cut into to provide passageways therethrough.

It has been determined that the cross-sectional area of the exit slot 38 should not be greater than about one-half the maximum cross-sectional area of the passageway 28, that is, the cross-sectional area of the latter just rearwardly of the step 36. The exact ratio is determined by the pressure in the duct 46 and the size of the aperture 44, i. e. the velocity of the jets issuing from the latter. In this same connection, the exact location of the entrance slot 24 is determined also by such jet velocity and, additionally, by the optimum design velocity of the airplane 10.

Figure 10:
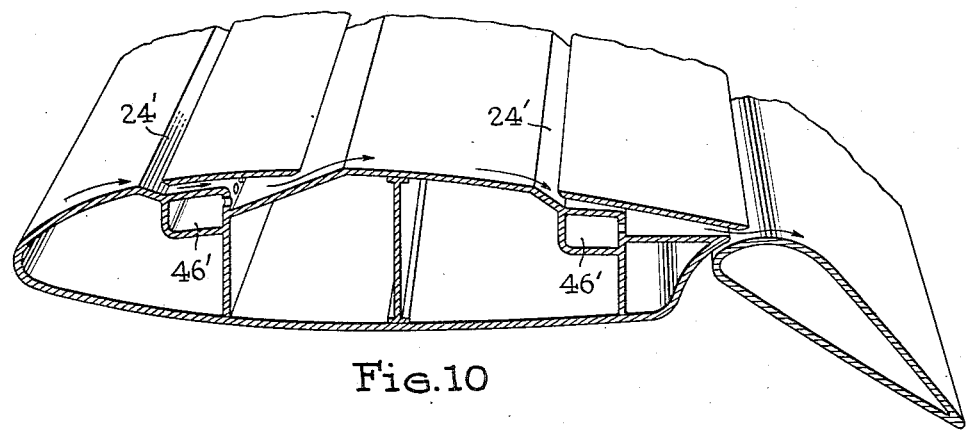
Fig. 10 is a perspective view, partly in section, embodying a form of this invention where a plurality of channels may be used on a fixed surface either with or without the embodiment shown in Fig. 7.

When it is desirable to increase lift in the forward portion of the body by preventing premature separation of flow around the body, the suction slot 24', as shown in Fig. 11, may be located on the forward portion of the body; the design of the detail items and operation of the device is as described for Figures 1, 2, 3 and 4. As a further variant, when it is desirable that the suction and blowing are made simultaneously at different locations along the periphery in order to maintain a more uniform control of the boundary layer through the entire length of the body, then a series of ducts 46' and 46' as shown in Fig. 10, can be used, or used in combination with the device embodied in a pivotal control surface as shown in Fig. 7. The distribution of air in the ducts 46' and 46' may be varied to suit the desired conditions by an appropriate valve mechanism not shown in the drawings.

The system embodying this invention can also be utilized to improve the efficiency of flight control surfaces, e. g. ailerons, flaps, rudder and elevators. Figures 5 and 6 show the application of the invention to a flap, where it is particularly effective.

Referring now to these figures: There is shown a wing 54 having a main body 56 and a pivotal trailing section 58 used as a flap. The main body 56 is equipped with boundary layer control structure identical to that heretofore described, i. e. entrance and exits slots 60 and 62, passageway 64, and duct 66.

In the upper surface of the flap 58 is an entrance slot 68, which is relatively wide and has its rear edge located at substantially the thickest part of the flap.

A shallow passageway 72 is formed, as before, by a bottom wall 74, extending rearwardly from the forward edge of the slot 68 and smoothly faired thereinto as at 74'. Preferably, the wall 74 extends generally parallel to the skin 78, forming the upper surface of the flap 58, but in slightly rearwardly convergent relation thereto. As in the main body 56, the body wall 74 is provided with a rearwardly facing step 80, which may be located at substantially the thickest part of the flap 58 for accommodation of a duct 82 within such part, having a series of jet issuing apertures 84 therein. The bottom wall 74 continues towards the trailing edge of the flap 58 and is faired smoothly, as at 86, into the rearward edge of an exit slot 88. The cross-sectional area of the slot 88 should not be greater than about one-half that of the passageway 72 just rearwardly of the step 80.

The duct 82 preferably is formed by two spanwise extending upright walls 90 which in conjunction with the skin 93 on the underside of the flap and the bottom wall 74' of the channel 72, forms a load carrying structural part of the pivotal surface, e. g. a spar. However, the shape of the duct 82 can be of any form, i. e., rectangular, tubular, elliptical, rhombic or any other shape consistent with the structure.

With the pivotal surface 58 located in the neutral or deflected position, air is supplied in the main duct 66 and blown through the apertures 65. However, if it is desired to supplement this flow, then air is simultaneously introduced under pressure into the duct 82 to issue in high velocity streams from the apertures 84. The source of such pressure may be the same as that for the main body 56, shown in Figures 5 and 6, and may be controlled by appropriate valve mechanism (not shown) which introduces air under pressure into the duct 82. Conversely, the duct 82 may be used as the prime source of air under pressure to issue in high velocity streams from the apertures 84 and by suitable valving mechanisms, not shown, air under pressure may be introduced into supply duct 66 and blown through the apertures 65 causing a suction at slot 60 and blowing at slot 62 which will supplement the flow at the exit slot 88. The result is to cause the air flowing over the upper surface of the flap to follow such surface more closely with a consequent reduction of turbulence and an increased lift and decreased drag for the entire wing 54. The system embodying this invention can also be utilized to improve the efficiency of the flight control surfaces only, e. g. ailerons, flaps, rudders and elevators. This is schematically shown in Fig. 7 where the device of this invention as illustrated in Figures 5 and 6 is shown applied to a flap. In Fig. 7 elements corresponding to elements shown in Figures 5 and 6 have the same reference numerals supplemented by a prime.

Figure 8:
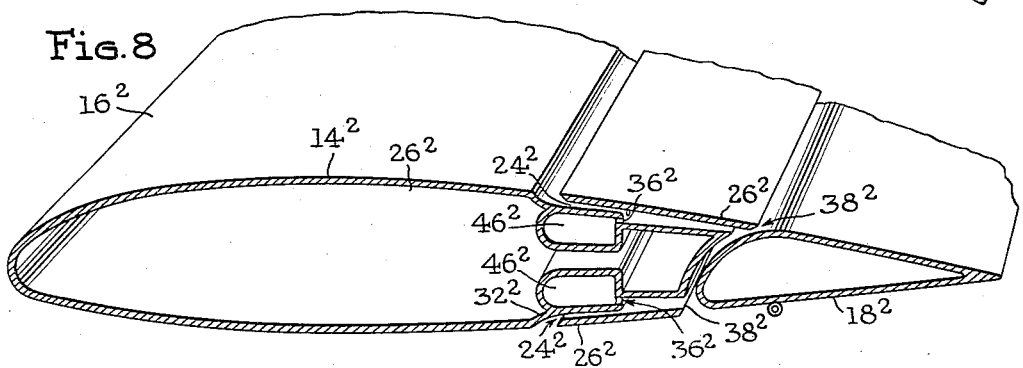
Fig. 8 is a perspective view partly in section embodying a modified form of this invention where the system is used to control the air on both the upper and lower surfaces of an airfoil.

Figure 8 shows a variant of the invention illustrated in Figures 1 to 4, where the boundary layer control devices are provided at both the upper and lower surfaces of the wing. Here again, corresponding parts are designated with the same reference numerals as in Figures 1 to 4, except that they are supplemented by an exponent 2. As will be observed, in this embodiment of the invention there are provided two separate blowing ducts $46^2$ and $46^2$. These boundary layer control devices can be used separately or simultaneously, as required.

Figure 9 shows a variant to the system as shown in Figures 1, 2, 3 and 4, where the main supply duct 126 forms a continuous duct around the periphery of a body such as a nacelle or fuselage 114. The continuous entrance or suction slot 124 is formed by a gap in the skin 121 of the main body 114 and a continuous fairing 122 and communicates directly with the forward end of a shallow rearwardly extending, unobstructed passageway 128 disposed immediately beneath the periphery of the body. The apertures 129 which direct the air out of the supply duct 126 are located around the periphery of the duct 126. The design of the step 136, entrance or suction slot 124, supply duct 126, exit or blowing slot 138, passageway 128, spacer members (not shown), are essentially the same as described for items 36, 24, 46, 38, 28 and 41 respectively in Figures 1, 2, 3 and 4.

Figure 12 illustrates the use of this device in a diffuser 144 having an inlet duct 145. Extending around the periphery is a continuous duct 146 and a continuous entrance or suction slot 147 for boundary layer air. The slot 147 is formed by a fairing 148, and communicates directly with the forward end of a shallow, rearwardly extending passageway 149 disposed inside the diffuser adjacent the inner surface thereof. Preferably the fairing 148 rearwardly of the slot 147 forms the inner wall of the passageway 149 so that the latter extends parallel to the diffuser wall rearwardly of the suction slot.

At its forward end, the wall 150 of the diffuser 144 slopes smoothly outwardly, as at 151, to a junction with the forward edge of the slot 147. Preferably the skin 152 of the fairing 148 is bevelled, as at 153 so that such bevel and the wall sloping portion 151 serve to fair the passageway smoothly into the slot 147. Consequently, boundary layer air adhering to the inner surface of the diffuser 144 forwardly of the slot can flow smoothly through the slot 147 and in the channel 149. At its forward end, the wall 150 is spaced generally parallel to the inner skin 152 and then has an outwardly offset to form a rearwardly facing step 14. Beyond the step 154, the inner fairing and the wall 150' continue rearwardly in a convergent relation so as to form a blowing slot 155. The passageway 149 is continuous and unobstructed between the suction slot 147 and the blowing slot 155. The inner fairing 148 may be supported to the diffuser in much the same manner as described in connection with Fig. 3 and Fig. 3A.

Disposed in the step 154 is a series of substantially uniformly spaced apertures 156 which communicate directly with the duct 146 and extend around the periphery of the duct. As described for Figures 1, 2, 3 and 4, fluid under pressure is ejected from the apertures 156 to supply the boundary layer control action as described in Figures 1, 2, 3 and 4.

Figure 13 shows a boundary layer control device of the present invention as described in reference to Figures 1 to 4 applied to a body without any pivotal surface such as guide vanes, compressor blades and similar elements. On this figure, the air flow is indicated by means of arrows. Blade A represents a typical blade without a boundary layer control device. The blade B is the same blade provided with a boundary layer control device of the present invention, which, however, is not in operation. Blade B' illustrates the same blade provided with a boundary layer control of the present device but in operation. It is clearly apparent that the operation of the device converts the turbulent flow present in case of blade A and B into laminar flow.

It thus will be seen that the objects of this invention have been fully and effectively accomplished. It will be realized, however, that the specific embodiments shown and described to illustrate the principles of this invention are susceptible to changes without departure from such principles. Therefore, this invention includes all embodiments encompassed within the spirit and scope of the following claims.

The term "aerodynamic device" as used in the appended claims comprehends any solid body having a surface over which a fluid flows. Thus, the term includes airfoils—as airplane wings and various control surfaces thereof, such as ailerons, flaps, elevators, rudders, etc.—aircraft fuselage and nacelles; diffusers; flow turning vanes of pumps, compressors, turbines, and other devices of a similar nature.

I claim:

1. In an airfoil, the combination of boundary layer control means comprising: fixed means defining a spanwise-extending entrance suction slot in the surface of the airfoil and disposed intermediate the leading and trailing edges thereof; fixed means defining a spanwise-extending exit blowing slot in said surface disposed between said entrance slot and said trailing edge; means defining a spanwise-extending, shallow, substantially straight, continuous, and substantially unobstructed passageway within the airfoil immediately beneath that portion of said surface connecting said slots, said passageway being faired into said slots for flow of boundary layer air into and out of said passageway through said entrance and exit slots, respectively, without appreciable change of direction from the flow of air over said surface; and means within the airfoil for supplying and directing a spanwise-extending series of substantially uniformly spaced high velocity streams of fluid into said passageway toward said exit slot to thereby induce flow of boundary layer air into said entrance slot, that portion of said passageway, extending between said entrance slot and said directing means, being of substantially uniform cross-sectional configuration and area throughout the entire length of said portion.

2. The structure defined in claim 1 in which the entrance slot is located rearwardly of the leading edge a distance equal from about 15% to about 55% of the chord of the airfoil.

3. The structure defined in claim 1 in which the cross-sectional area of the exit slot is not greater than one-half the maximum cross-sectional area of the passageway.

4. The structure defined in claim 1 in which the surface portion comprises a fairing secured to the airfoil and forming a wall of the passageway.

5. The structure defined in claim 1 in which the slots, passageway, and series of jet streams extend substantially the entire span of the airfoil.

6. The structure defined in claim 1 in which the jet directing means comprises a rearwardly-facing step in the bottom of the passageway intermediate the ends thereof and having a spanwise-extending series of apertures therein, and duct means within the airfoil for supplying fluid under pressure to said apertures.

7. In an airfoil comprising a main body and a pivotal trailing section, the combination of boundary layer control means comprising: fixed means defining a spanwise-extending entrance suction slot in the surface of the main body disposed intermediate the leading edge thereof and the trailing section; fixed means defining a spanwise extending exit blowing slot in said surface at the trailing edge of the main body; means defining a spanwise-extending, shallow, substantially straight, continuous and substantially unobstructed passageway within the main body immediately beneath that portion of said surface connecting said slots, said passageway being faired into said slots for flow of boundary layer air into and out of said passageway through said entrance and exit slots, respectively, without appreciable change of direction from the flow of air over said surface; and means within the main body for supplying and directing a spanwise-extending series of substantially uniformly spaced high velocity jet streams of fluid into said passageway toward said exit slot to thereby induce flow of boundary layer air into said entrance slot, that portion of said passageway extending between said entrance slot and said directing means being of substantially uniform cross-sectional configuration and area throughout the entire length of said portion.

8. The structure defined in claim 7 wherein the entrance slot is disposed rearwardly of the leading edge a distance equal to from about 15% to about 55% of the chord of the airfoil.

9. The structure defined in claim 7 including fixed means defining a spanwise-extending entrance suction slot in the corresponding surface of the trailing section adjacent the leading edge thereof; fixed means defining a spanwise-extending exit blowing slot in said corresponding surface rearwardly of said last mentioned entrance slot; means defining a spanwise-extending shallow, substantially straight, continuous and substantially unobstructed passageway within said trailing section immediately beneath that portion of said corresponding surface connecting said slots therein, said latter passageway being faired into said slots for flow of boundary layer air into and out of said latter passageway through said entrance and exit slots, respectively, without appreciable change of direction from the flow of air over said corresponding surface; and means within the trailing section for directing a spanwise-extending series of substantially uniformly spaced high velocity jet streams of fluid into said latter passageway toward said exit slot.

10. The structure defined in claim 1, in which the cross-sectional area of the passageway at the directing means is larger than that of said passageway portion, and said area tapers substantially uniformly rearwardly from said directing means to the exit slot.

11. In an aerodynamic device having a surface adapted to be exposed to the flow of fluid thereover and terminating in leading and trailing portions which determine the normal direction of said flow, boundary layer control means comprising: means defining a depression in said surface between said leading and trailing portions, said depression extending generally along a line defined by the intersection with said surface of a plane transverse to said direction; fairing means associated with said depression and spaced from the bottom thereof to constitute a continuation of said surface to form a shallow, continuous and substantially unobstructed fluid passageway presenting fluid entrance and exit openings which are fixed relatively to said surface, said passageway being faired into said openings for flow of boundary layer fluid into and out of said passageway through said entrance and exit openings without appreciable change of direction from the flow of fluid over said surface; means located on said aerodynamic device for supplying and directing a series of substantially uniformly spaced high velocity jet streams of fluid into said passageway between the ends thereof and across substantially the entire transverse dimension thereof toward said exit opening, to thereby induce flow of boundary layer fluid into said entrance opening.

12. The structure defined in claim 11, in which the device is hollow, the surface is an interior surface, and the fairing means is positioned inside the device.

13. The structure defined in claim 11, in which the device is generally circular in cross section, the surface is an exterior surface, and the depression extends generally circumferentially thereof.

14. The structure defined in claim 11, in which the device is an airfoil and the depression extends generally spanwise thereof.

15. The structure defined in claim 11 in which the cross sectional area of the exit opening is not greater than one-half the maximum cross sectional area of the passageway.

References Cited in the file of this patent

UNITED STATES PATENTS

| | | |
|---|---|---|
| 2,348,792 | Dornier | May 16, 1944 |
| 2,585,676 | Poisson-Quinton | Feb. 12, 1952 |

OTHER REFERENCES

Aero Digest, April 1, 1945, pp. 98, 99, 170.